June 11, 1963 E. P. NEY ET AL 3,093,351
BALLOON AND METHOD OF LAUNCHING THE SAME
Filed Dec. 15, 1961 7 Sheets-Sheet 1
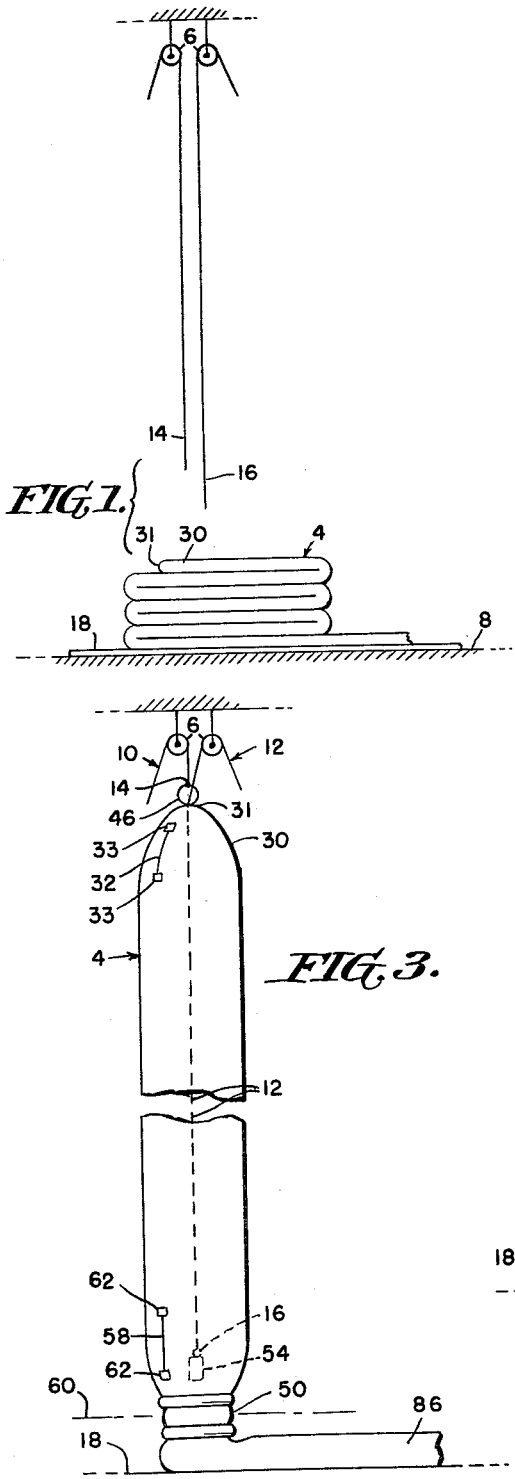
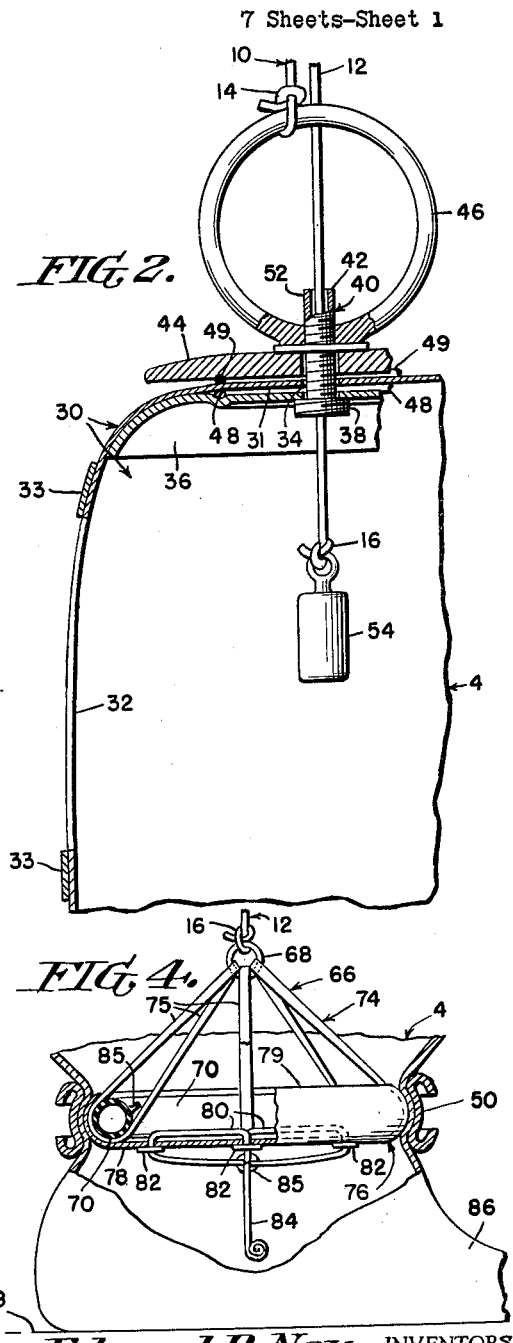
Edward P. Ney
Rudolph B. Thorness
John R. Winckler
INVENTORS
BY Louis Sheldon
ATTORNEY June 11, 1963 E. P. NEY ET AL 3,093,351
BALLOON AND METHOD OF LAUNCHING THE SAME
Filed Dec. 15, 1961 7 Sheets-Sheet 2

Edward P. Ney
Rudolph B. Thorness
John R. Winckler
INVENTORS

BY Louis Sheldon
ATTORNEY

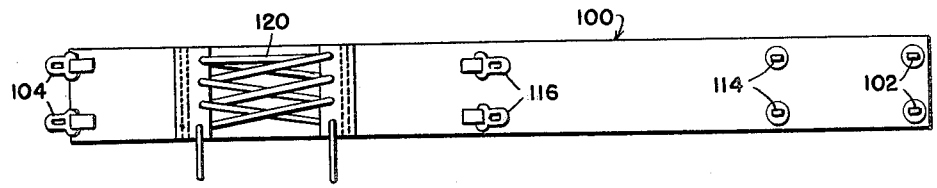
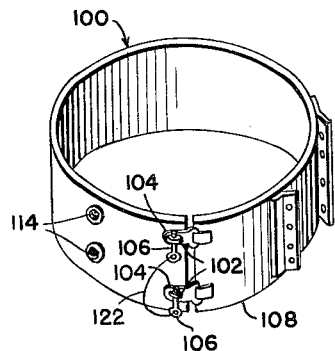
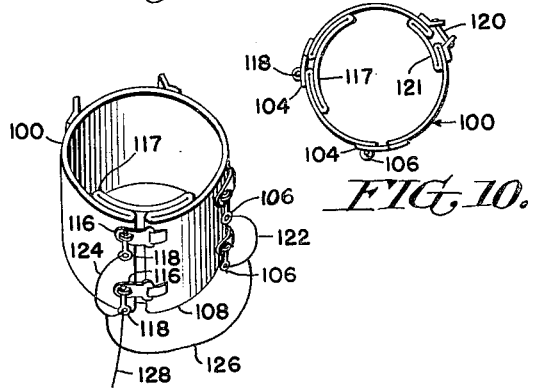
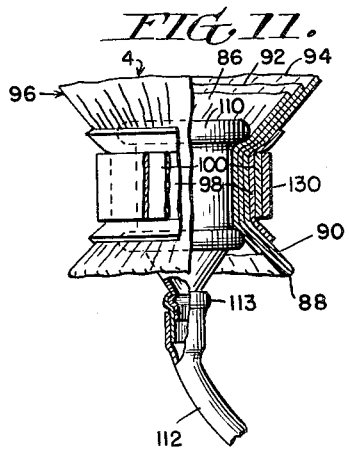

June 11, 1963 E. P. NEY ET AL 3,093,351
BALLOON AND METHOD OF LAUNCHING THE SAME
Filed Dec. 15, 1961 7 Sheets-Sheet 4
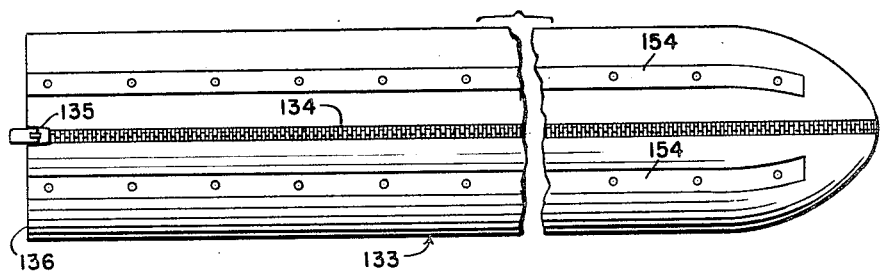
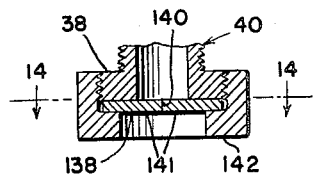
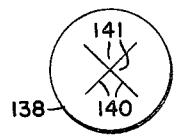
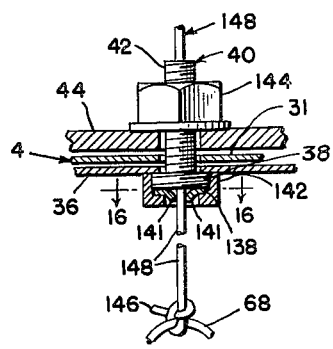
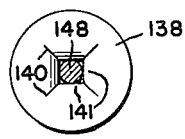
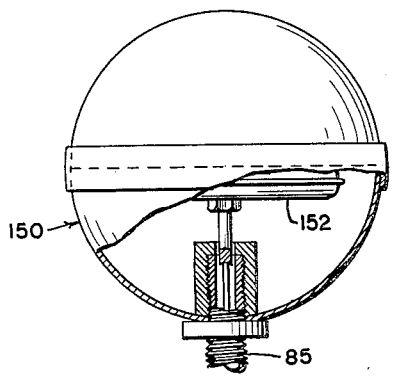
Edward P. Ney INVENTORS
Rudolph B. Thorness
John R. Winckler
BY Louis Sheldon
ATTORNEY June 11, 1963  E. P. NEY ET AL  3,093,351
BALLOON AND METHOD OF LAUNCHING THE SAME
Filed Dec. 15, 1961  7 Sheets-Sheet 5

*Edward P. Ney*
*Rudolph B. Thorness* INVENTORS
*John R. Winckler*

BY *Louis Sheldon*
ATTORNEY

June 11, 1963     E. P. NEY ET AL     3,093,351
BALLOON AND METHOD OF LAUNCHING THE SAME
Filed Dec. 15, 1961     7 Sheets-Sheet 6

Edward P. Ney    INVENTORS
Rudolph B. Thorness
John R. Winckler

BY Louis Sheldon
                ATTORNEY

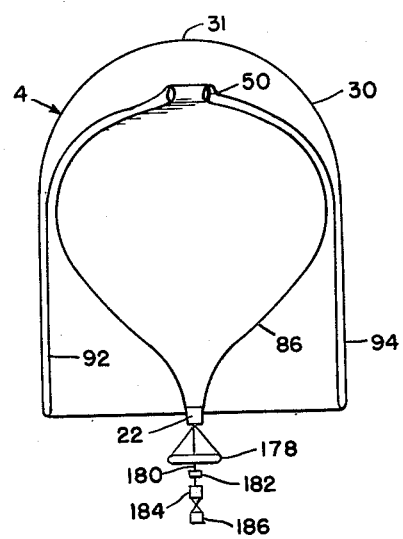
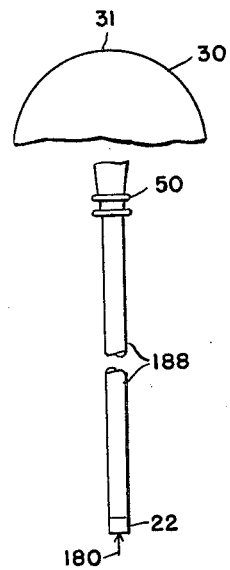
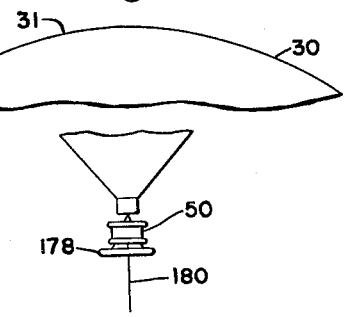
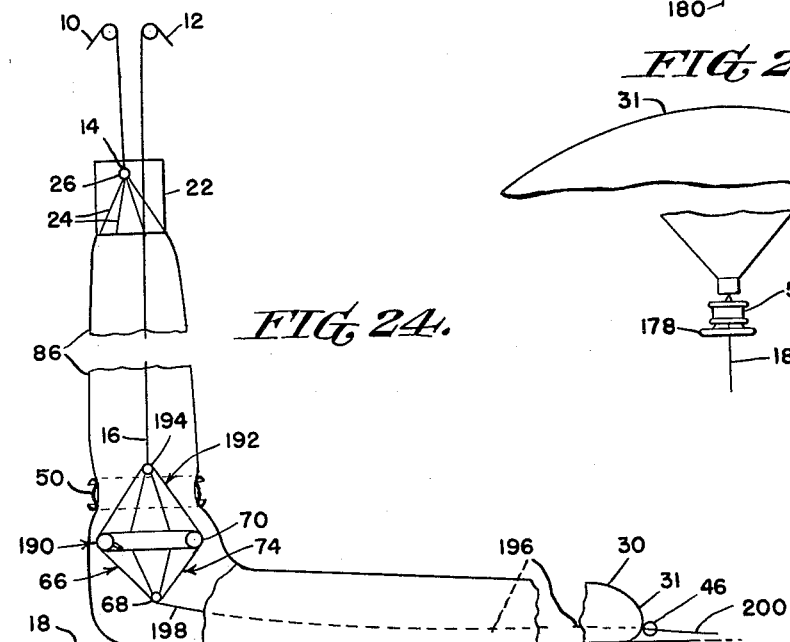

United States Patent Office 3,093,351
Patented June 11, 1963

3,093,351
BALLOON AND METHOD OF LAUNCHING THE SAME
Edward P. Ney, Rudolph B. Thorness, and John R. Winckler, all of Minneapolis, Minn., assignors, by mesne assignments, to the United States of America as represented by the Secretary of the Navy
Filed Dec. 15, 1961, Ser. No. 159,799
19 Claims. (Cl. 244—98)

This invention relates to high altitude balloons and is concerned more particularly with launching and preparation therefor.

The conventional stratosphere or higher altitude balloon designed to float at a predetermined ceiling altitude is made of thin light weight inelastic film such as polyethylene or "Mylar." In preparation for launching, the balloon envelope is uncrated at the launching site, and the end which is to be uppermost is inflated with helium or other lift gas to form an inflation bubble which is a small fraction of the volumetric capacity of the envelope, while the remainder is extended full length over a cloth on the ground downwind from the inflated end. When the inflation is completed and the load items attached to the uninflated end, the balloon system is released, whereupon the rising bubble gradually "peels" the remainder of the envelope off the ground. Many such envelopes are hundreds of feet in length, and, in such a launching, a substantial area of the partially inflated tethered bubble constitutes sail area which at times, even in light winds, renders difficult or impossible a successful launching. Somewhat higher winds can be successfully coped with where use is made of a windscreen, but there are limits to its usefulness in winds as high as about 18 knots, and a windscreen is not always available.

It is an object of the invention to enable a balloon to be launched in substantially more brisk winds than has heretofore been feasible.

Another object of the invention is to prepare a high altitude balloon for vertical launching.

Another object of the invention is to provide a balloon envelope so arranged as to require substantially reduced space from inception to completion of the launching of the balloon.

A further object is to provide a folded balloon envelope whose length at launching is substantially less than its normal (extended) length.

Another object is to provide an improved launching method.

An additional object is to provide a balloon which can be launched irrespective of shifts in surface wind direction.

Further objects and advantages of the invention will appear as the description proceeds.

The invention will be better understood on reference to the following description and the accompanying drawing, in which:

FIG. 1 is a diagrammatic elevational view of a balloon envelope just as it is removed from its packing crate and arranged over a ground or floor cloth below a pair of elevated pulleys at the inception of the preparation for folding the envelope in accordance with the invention, and some of the equipment used in such preparation.

FIG. 2 shows in section and elevation the top of the envelope clamped to a lift ring to enable the top of the envelope to be raised.

FIG. 3 is an elevational view showing among other things the form assumed by the envelope when the top thereof is fully lifted preparatory to the step of telescopically folding the envelope.

FIG. 4 shows in section and elevation a low part of the envelope clamped between a girdle and an inflated elastic tube such as an automobile tire inner tube.

FIGS. 7 to 10 show details of the corset.

FIG. 11 shows the inflation thimble and attached hose in assembly with the triple-wall envelope formation and the corset.

FIG. 12 is an elevational view of a closed zippered sack in which the telescoped envelope is to be placed for delivery to the launching site.

FIG. 13 shows in section a closed packing gland added to the top ring assembly of FIG. 2 at the launching site after the telescoped envelope is laid out over the opened sack.

FIG. 14 is a face view of the closed gland gasket, taken at 14—14 in FIG. 13.

FIG. 15 is similar to FIG. 13 but shows the gasket flexed open by an inserted cord which is to serve as an anchor line at the launching site.

FIG. 16 is a face view of the open gland gasket and a sectional view of the inserted anchor cord, taken at 16—16 in FIG. 15.

FIG. 17 shows an aneroid deflator for the tube of FIG. 4.

FIG. 21 shows the balloon system partly extended shortly after launching.

FIG. 22 shows the balloon system airborne and fully extended but below ceiling altitude, with the girdle exposed.

FIG. 23 shows the balloon system at ceiling altitude, with the girdle off the envelope.

FIG. 24 shows a modified apparatus in another method of telescoping the balloon envelopue to prepare it for launching.

Figure 5:
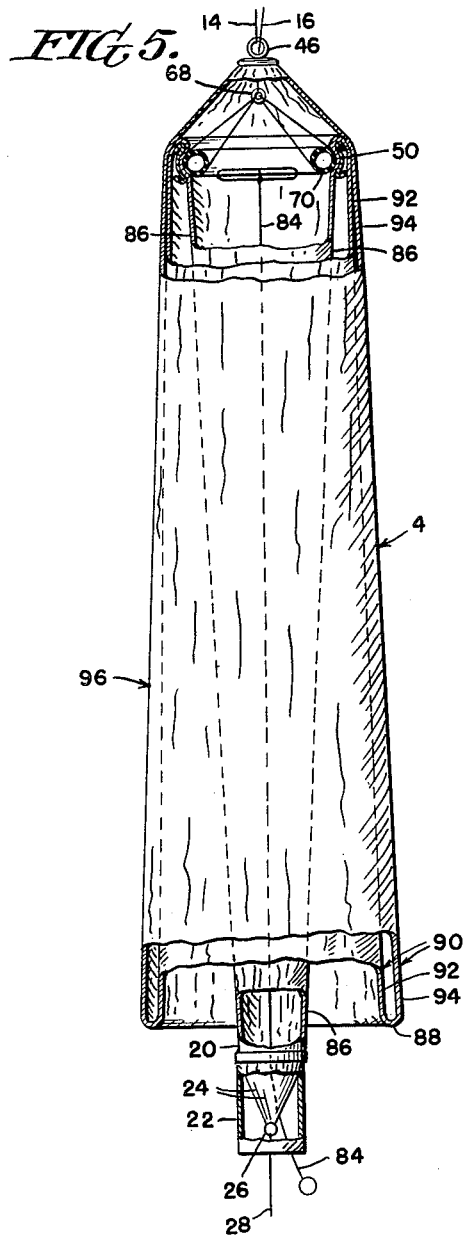
FIG. 5 shows the upper two-thirds of the envelope telescoped and draped in the form of a double-walled shroud about the lower third, providing a triple-wall envelope formation.

The equipment for enabling an uninflated high altitude balloon film envelope or cell 4 to be placed in the condition in which it is to arrive at the launching site comprises two adjacent elevated pulleys 6 (FIG. 1) mounted in a building and at a height somewhat over ⅔ of the fully extended length of the envelope. This height, for a 132' envelope, for example, should therefore be about 90' or more. Two power winches (not shown) are mounted on the building floor 8 approximately 20' from a point substantially directly below the pulleys 6 and are connected by cords 10 and 12 to the respective pulleys, the free ends 14 and 16 of the respective cords being allowed to extend down close to the floor.

A canvas or other suitable cloth 18 is laid out on the floor 8 beneath the pulleys 6; the envelope 4, equipped at its open bottom 20 (FIG. 5) with a skirt appendix 22, load strings 24, a load ring 26, and an anchor line 28 connected to the ring, and suitably packed, as in rolled or accordion fashion, is removed from its packing crate (not shown) and placed on the floor cloth with the envelope crown 30 uppermost; the crown top 31 is then raised (FIG. 2) slightly to permit an incision 32 about 16" long to be made in the crown, the top of the incision being about 1' down from the crown top; colored markers 33 are applied at the ends of the incision to enable the incision to be readily located by the crew; and a hole 34 is punched in the top. An aluminum or other suitable inner clamp disc 36 is seated on the head 38 of a sleeve screw 40 and the two passed inward through the incision 32 and then the screw shank 42 is passed upward through the crown hole 34; an outer aluminum or other suitable clamp disc 44 is applied over the crown top 31 and about the screw shank; and a steel or other suitable top lift nut ring 46 is threaded on the shank to clamp the crown top between rubber O rings 48 and 49 assembled with the respective discs. The lift ring 46 is then pulled up through an aluminum or other suitable light-weight girdle 50 (FIG. 3) which slides down freely about the envelope 4. The girdle 50 may be wrapped in nylon or other suitable tape (not shown) to protect the film of the envelope 4.

Referring to FIG. 2, the cord end 14 is now secured to the lift ring 46; the cord end 16 is slipped down through the bore 52 of the sleeve screw 40, and a preferably polished steel or other suitable smooth weight 54, capable of sliding freely within the envelope 4, is passed inward through the incision 32 and tied to the cord end 16.

The winch (not shown) connected with the cord 10 is then operated to pull the cord down and thereby lift the ring 46 so as to raise the top 31 of the crown 30 to a height (FIG. 3) which is 2/3 of the extended (normal) length of the uninflated envelope 4, the raised portion of the envelope sliding up through the girdle 50, so that the girdle and weight 54 remain substantially stationary relative to the floor.

Now a 3' incision 58 (FIG. 3) is made in the envelope 4 upward from a point about 1' above the level 60 which is 2/3 of the extended length of the envelope down from the crown top 31; colored markers 62 are applied at the ends of the incision to enable the incision to be readily located by the crew; a hose (not shown) is inserted through the incision; and air is pumped through the hose into the envelope until the suspended gathered envelope film is loosened and hangs freely; then the hose is removed.

The girdle 50 is then raised by hand to and held at a level about 3' above the incision 58; and a crew member reaches through the incision and unties the weight 54 from the cord end 16, removes the weight, holds onto the cord end, inserts a tube assembly 66 (FIG. 4) through the incision, and attaches the cord end to the tube assembly harness ring 68. The assembly 66 comprises a partially inflated elastic tube 70 (such as an automobile tire inner tube), wrapped in nylon or other suitable tape (not shown) to reinforce and prevent expansion of the tube with increased air pressure therein, and supported by a harness 74 formed of nylon or other suitable tapes 75 attached at their upper ends to the ring 68; a nylon or other suitable sheet 76 affording a fluid-tight diaphragm 78 extending across the bottom of the tube and having an upwardly extending flange 79 about the tube and there held as by tape (not shown); crossed interlocked ropes 80 passing through holes in the diaphragm and in tape 82 adhesively secured to the diaphragm to reinforce and make fluid-tight the diaphragm about the holes through which the ropes pass; and an end of a rip cord 84 tied to the ropes where they cross below the diaphragm.

The winch (not shown) connected with the cord 12 is now operated to allow the tube assembly 66 to gravitate until the tube 70 is at the envelope level 60 (FIG. 3) and substantially centered under the pulleys 6. Then a crew member arranges the folds of the envelope 4 evenly about the tube 70; reaches through the incision 58 and manipulates the tube valve 85 to partially deflate the tube; slides the girdle 50 down to surround the envelope film material about the tube; again reaches through the incision to attach a tire pump (not shown) to the valve; and inflates the tube to a pressure of about 13 lb. p.s.i., thereby clamping the envelope material firmly between the tube and the girdle. Then the incision 58 is closed, as by heat-sealing.

The winches (not shown) are then operated simultaneously: one winch in a direction to raise the cord end 16 and hence the tube assembly 66 and girdle 50 and envelope portion clamped thereby to erect the lower third 86 (FIG. 5) of the envelope 4; and the other winch in a direction to allow the cord end 14 to descend and hence the upper two-thirds of the envelope to drape freely about the girdle and the lower third of the envelope until the top ring 46 is about 3' above the tube 70, so that the bottom 88 of the resulting double-walled canopy or shroud 90, comprising the envelope wall sections 92 and 94, is located about 1' above the envelope bottom 20. As the envelope bottom 20 is lifted off the floor cloth 18, the diaphragm rip cord 84 will unroll or its lower part may be pulled out of the appendix 22. The envelope 4 is thus telescoped into a three-ply or triple-walled tubular formation generally indicated at 96.

Figure 6:
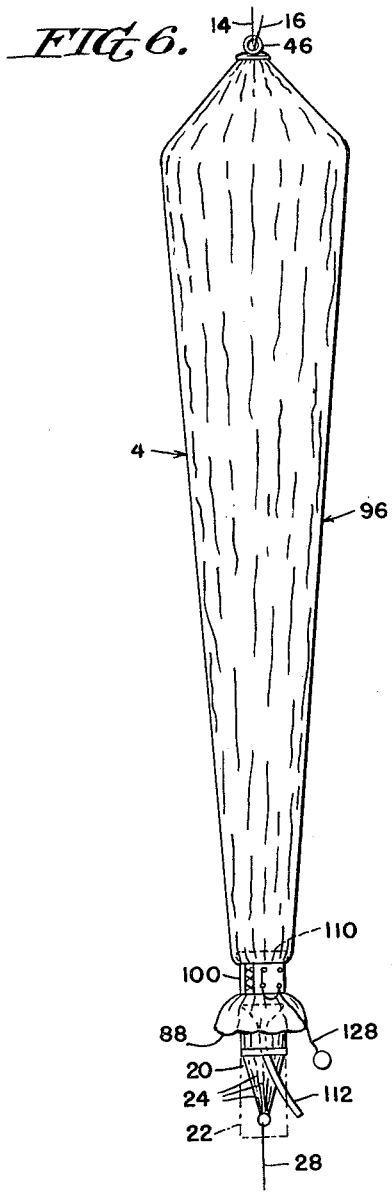
FIG. 6 shows the lower part of the triple-wall formation clamped between a corset and an inflation thimble.

A crew member now more or less evens the shroud bottom 88, and then a thin sheet 98 (FIG. 12) of polyethylene or other suitable film material, about 8' by 2', is wrapped about the lower part of the formation 96 so as to crowd the shroud 90 against the innermost envelope wall portion 86 to serve as a liner to protect the shroud from a canvas or other suitable corset 100 (FIGS. 6 to 11, 19, and 20). The corset 100 as in FIG. 7 is placed about the liner 98 and connected at its ends by eyes 102 which are projected through hasps 104 and releasably locked in place by friction coupling pins 106 with the corset at full girth (FIG. 8) and its bottom 108 about 1' above the shroud bottom 88. An inflation thimble or nipple 110 (FIG. 11) is now inserted upward through the appendix 22 and between load strings 24 and into the envelope bottom 20 and substantially centered with the corset 100, a hose 112 being swivel-connected at 113 to the thimble and extending down out of the appendix and load strings (FIG. 6). Then the corset 100 is tightened and its intermediate eyes 114 projected through its intermediate hasps 116, providing a dovetail inside pleat 117 (FIG. 9), and so releasably locked by friction coupling pins 118, thereby locking the thimble 110 lightly in place. The corset lacing 120 (FIGS. 7 and 10) is then pulled and tied to clamp the three plies 86, 92, and 94 of the envelope formation 96 tight between the corset 100 and the thimble 110, providing a second inside dovetail pleat 121 (FIG. 10). As seen in FIG. 9, the pins 106 are connected by a cord 122, the pins 118 by a cord 124, these two cords are connected by a loose third cord 126, and a quick-release cord or lanyard 128 is connected to the bottom pin 118. A piece 130 (FIG. 11) of polyethylene or other suitable sheeting is now wrapped and secured about the tightened corset 100 to prevent accidental withdrawal of the coupling pins 106 and 118. The corset liner 98 and cover 130 are omitted from the other figures, and the lacing 120 is omitted from some figures, for convenience.

A longitudinally zippered balloon container such as the sack 133 (shown closed and extended in FIG. 12), is now laid out, its zipper 134, whose grip is shown at 135, is opened, and the sack is spread over the floor cloth 18 and beneath the erect envelope formation 96, and then the winches (not shown) are operated to allow the rings 46 and 68 to gravitate simultaneously and thus, the formation to settle. While the formation 96 is settling it is adjusted or nudged sidewise by the crew so as to be laid out horizontally along the open sack 133. For a 132' balloon envelope the sack 133 should be about 43' long and its bottom or hem 136 about 9' in circumference. Then a crew member unties the cord end 14 from the top lift ring 46; reaches through the crown incision 32 (FIG. 2) and unties the cord end from the harness ring 68 (FIG. 4); removes the cord end 16 from the envelope; seats a rubber packing gasket 138 (FIG. 14), having center crossed slits 140 affording tongues 141, in a flange nut 142 (FIG. 13) and passes them through the incision and threads the nut tight on the sleeve screw head 38; replaces the top lift ring by a plain nut 144 (FIG. 15); stiffens an end 146 of a cord 148 and passes the cord end down through the sleeve screw 40, and, by flexing of the gasket tongues, forces the cord end 146 through the resulting gasket hole, and passes the cord end through the nut 142; and reaches through the incision and ties the cord end 146 to the harness ring (FIG. 15). The cord 148 is subsequently used to moor the upper part of the triple-ply envelope formation 96 to the ground preparatory to and during inflation, as will appear.

The open spread sack 133 and the telescoped envelope formation 96 laid out thereon are now rolled up, beginning at the bag hem 136, as far as the air trapped within the innermost and intermediate formation walls 86 and 92 will permit, a piece of cardboard (not shown) being conveniently used to temporarily brace the crown incision 32 open so that air between the shroud walls 92 and 94 can escape. Additional incisions (not shown) are made in the envelope walls 86 and 92 to release the trapped air for escape through the crown incision 32, and are then closed, as by heat-sealing and taping. This procedure for expelling the air is followed if the balloon is to be launched forthwith. If there is no urgency, the air will normally escape of its own accord in a day or so without requiring the procedure just noted.

If the balloon is to be flown immediately, a pressure release or deflector 150 (FIG. 17), to be triggered as by an aneroid bellows 152 to deflate the tube 70 at an altitude below ceiling altitude, as will appear, is inserted through the crown incision 32 and applied to the tube valve 85, and then the incision is heat-sealed and taped. If the balloon is not to be flown immediately, the incision 32 may be left open and the deflator 150 applied when launching is imminent, and then the incision is closed as noted.

After the air has left the envelope formation 96, the open sack 133 and the formation are unrolled (if not already extended), and the sack is zipped closed and then rolled tightly (with the telescoped envelope therein), ready for delivery to the launching site. If desired, the sack 133 may be provided with lacing (not shown) to be used with the sack's lacing strips 154 to tighten the closed sack about the formation 96 before the envelope-containing sack is finally rolled.

Figure 18:
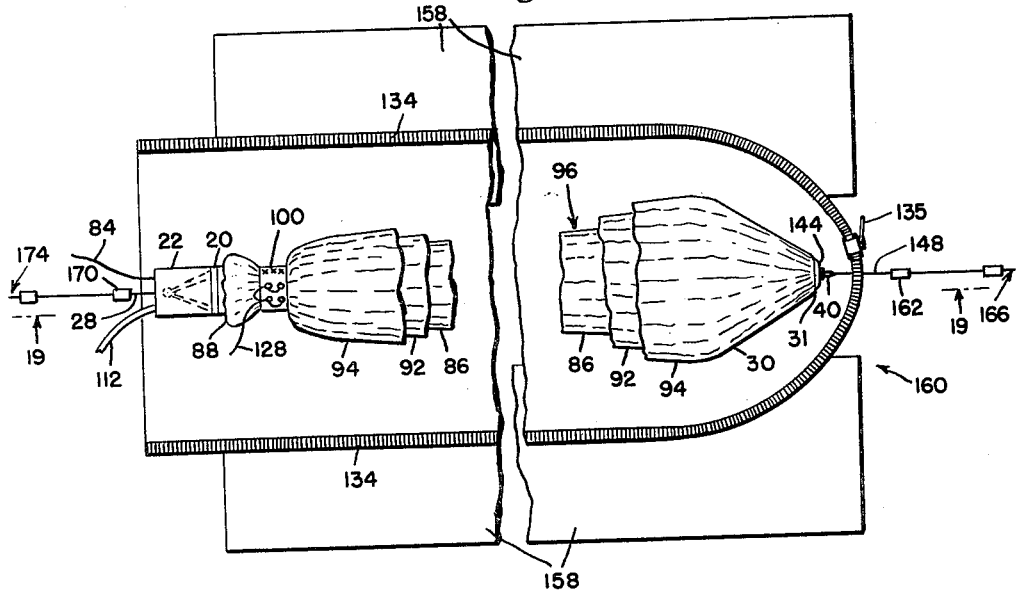
FIG. 18 shows the telescoped envelope laid out over the opened sack and moored to the ground at the launching site and about to be inflated with lift gas.

At the launching site, two spaced canvas ground cloths 158 are laid out near a windscreen (not shown) and the rolled sack 133 (containing the uninflated telescoped envelope formation 96) is unrolled on the ground between the cloths; and then the sack is zipped open and spread to overlap the ground cloths and provide therewith a composite widened ground cover indicated generally at 160 (FIG. 18). The anchoring or mooring line 148 from the harness ring 68 is now passed under a pulley 162 (FIGS. 18 and 19) swiveled to a stake 164 near the envelope crown 30, and then the line is assembled with a block-and-tackle 166 anchored to a mooring stake 168. Likewise the anchoring or mooring line 28, connected to the load ring 26, is passed under a pulley 170 swiveled to a stake 172 near the load ring and then the line is assembled with a block-and-tackle 174 secured to a mooring stacke 176. Thus both ends of the envelope formation 96, now horizontal, are tethered to the ground.

Figure 19:
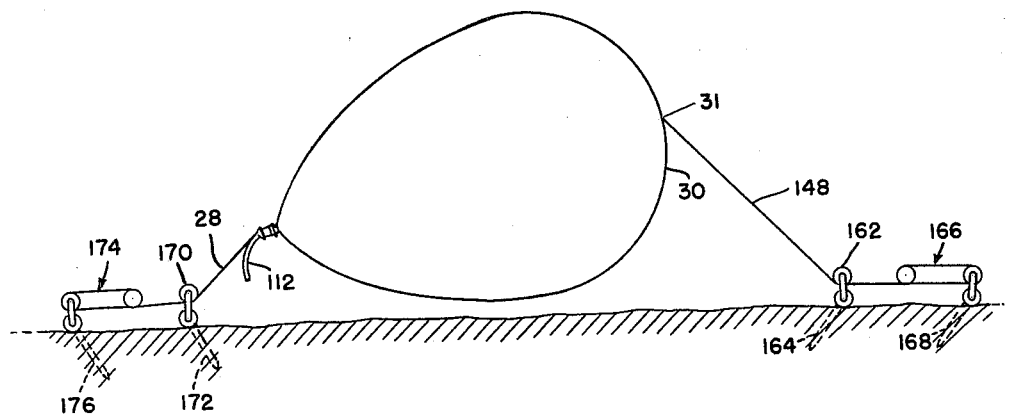
FIG. 19 is taken at 19—19 in FIG. 18 but shows the balloon inflated though still moored.
Figure 20:
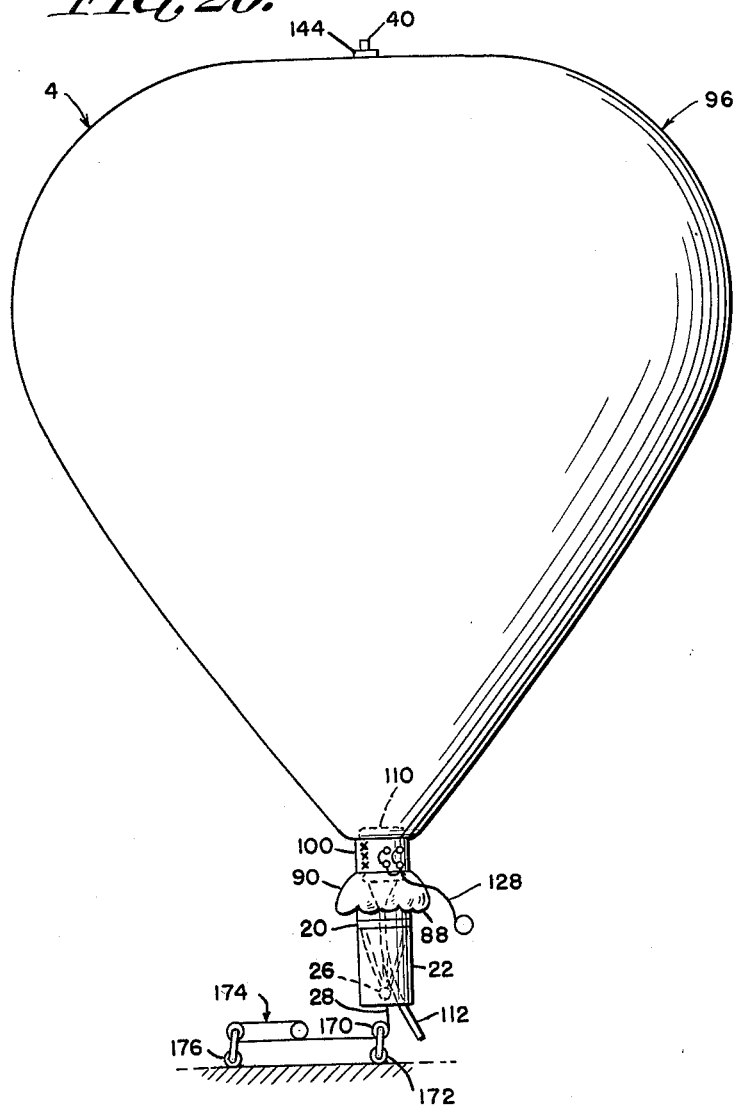
FIG. 20 shows the inflated telescoped envelope erected and moored only at its lower end.

The inflation hose (not shown) from the helium or other lift gas supply (not shown) is then temporarily coupled to the inflation thimble hose 112 as seen in FIG. 18 and inflation is started. When the proper quantity of gas assuring a predetermined free lift has been fed into the compartment defined by the diaphragm 78 and the innermost wall 86 of the envelope formation 96, the lift gas supply is shut off, the inflation hose from the lift gas supply is uncoupled from the thimble hose 112, and the mooring line 148 is cut (preferably close to the sleeve screw 40 at the outside of the envelope 4) by a crew member to allow the envelope formation 96, due to the buoyancy provided by the contained lift gas, to swing to an erect position, with the crown end of the formation uppermost, leaving the formation tethered solely by the line 28 (FIG. 20). Just before the line 148 is severed, the envelope appears substantially as shown in FIG. 19.

Now a girdle catcher 178 (FIG. 21) is connected to the load ring 26, a load line 180 is passed through a squib 182 and connected to the load ring, and a parachute 184 and gondola 186, carrying meteorological data gathering and telemetering equipment including an antenna 188, are connected to the load line and other rigging completed. The parachute at such time is packed, and the antenna is in the form of a roll or spool, so that the entire load train is within a foot or so of the load ring 26.

The corset cover 130 (FIG. 11) is now removed, and the lanyard 128 is pulled sufficiently to release only the corset coupling pins 118, allowing the three walls of envelope material confined by the corset 100 to spread the corset within the limit (FIG. 8) permitted by the unreleased pins 106, and the inflation thimble 110 to fall onto the load strings 24, whence the thimble is removed. A crew member then released the mooring line 28 from the block-and-tackle 174, and pays out the line slowly under the sheave 170 to allow the erect formation 96 to rise slowly until the gondola 186 is clear of the ground, whereupon, by yanking the lanyard 128, he withdraws the coupling pins 106, and then he removes the corset 100 and its liner 98 (FIG. 11). Then the diaphragm rip cord 84 is yanked to rupture the diaphragm 78 and thus free the gas to transfer upward and gradually cause the crown 30 to rise and extend the telescoped envelope, the cord being pulled down completely out of the envelope, and thereupon the final mooring line 28 is severed, thus launching the balloon system. At this stage the balloon system appears substantially as indicated diagrammatically in FIG. 21.

With careful preparation in accordance with the invention, balloon systems have been airborne in about thirty minutes after arrival at the launching site.

As the balloon system soars, the gas transfer continues, raising the shroud 90 relative to the envelope bottom 20 until the envelope is no longer telescoped (FIG. 22) as the system drifts with the wind as part of the air stream. With helium as the lift gas, the transfer to the upper ⅔ of the envelope takes place in about two minutes, i.e., when the system is at an altitude of about 1500' to about 2000'.

As the envelope top 31 proceeds to rise relative to the bottom 20 of the envelope, the part of the cord 148 still connected to the harness ring 68 slips down completely through the top clamp assembly, allowing the packing gasket 138 to close substantially gas-tight. When the envelope 4 is completely extended in the air (FIG. 22), all of the gas is in the part of the envelope above the girdle 50, and the remainder 188 of the envelope film, being restricted at the top by the girdle and tensioned by the load items suspended therefrom, offers minimum sail area and thus hangs substantially straight down from the girdle.

At a predetermined altitude, say 15,000 feet, the air pressure is automatically released from the tube 70 by the deflator 150, so that the tube assembly 66 falls and is caught in the load strings 24 where it is held throughout the remainder of the flight. The girdle 50 may stay in place if its friction with the envelope fabric is high enough and the girdle's weight is low enough, until cammed down by the adjacent enlarging envelope cone angle as the upper part of the envelope fills out with increasing altitude, the part of the envelope below the girdle remaining columnar, offering minimum sail area. When or shortly before the envelope 4 first reaches its ceiling altitude, the girdle 50 will have been moved free of the envelope and been caught by the girdle catcher 178 (FIG. 23).

After the system is airborne the packed parachute is automatically triggered (by means not shown) to extended form (FIGS. 22 and 23) when the system is sufficiently high to insure that such extension will not cause the gondola to touch ground. When the system is at an altitude of a few thousand feet, the antenna is automatically triggered (by means not shown) to extend as shown in FIGS. 22 and 23 so that the antenna will not touch ground.

Although the wind shelter afforded by a windscreen eases launchings, a windscreen is not always essential; successful launchings in the open without benefit of windscreens have been conducted in accordance with the invention in winds up to about 37 knots.

Inasmuch as control of the envelope and its load is maintained until the system is airborne, chance of damage to the envelope and/or load is minimized. Vertical launchings have the further advantages, among others, that the envelope, being telescoped during the launching procedure, is much more rugged and subject to considerably less buffeting before the balloon system is airborne, and such launchings are unaffected by shifts in wind direction.

As shown in FIG. 24, the envelope 4 can be telescoped in a building having a head room or height which need be only slightly more than ⅓ the normal length of the uninflated envelope 4, with the use of a tube assembly 190 differing from the assembly 66 only in that the assembly 190 has a second harness 192 with a harness ring 194.

In accordance with this modification, the tube 70 is inflated to about 3 lbs. p.s.i., the pulley cord end 16, outside the envelope and at the floor, is tied to the harness ring 194, then the assembly 190 is inserted through the appendix 22 and between load strings 24 into the envelope bottom 20 and the girdle 50 placed about the appendix and below the tube. With the load ring 26 connected to the cord end 14, from the outside of the envelope, the applicable winch is operated to pull up the load ring 26 and hence upend the envelope bottom, while the girdle 50 and tube assembly 190 remain adjacent the floor (FIG. 24), until the envelope bottom is ⅓ of the envelope length up from the floor, the girdle being then slightly above the tube 70. While a crew member holds the tube 70 somewhat off the floor, another crew member holds the girdle 50 slightly spaced above and substantially coaxial with the tube, and a third crew member arranges the circumferentially gathered balloon film substantially uniformly about the tube. The girdle 50 is then worked down and around the tube 70, thereby (lightly) clamping the balloon film therebetween. A cord 196, an end 198 of which is initially tied to the ring 68 of the harness 74, is then worked along the ⅔ of the envelope still on the floor and passed out of the crown 30 through the tubular screw 40. Incisions are made along the envelope as necessary to enable the cord 196 to be so strung along the envelope, and then the incisions are sealed. Now an incision is made above the girdle 50, the cord end 16 is untied from the second harness ring 194, the second harness 192 is cut off from the assembly 190 and removed, and the vertical part 86 of the envelope is allowed to settle to the floor cloth 18.

Then the cord end 14 is untied from the load ring 46, and tied to the lift ring 46, and the cord end 16 is tied to the free end 200 of the cord 196. Now the corresponding winches are operated simultaneously, raising the crown top 31 slightly more than ⅓ of the uninflated length of the envelope 4 and raising the tube 70 (and with it the girdle 50 and balloon film portion clamped therebetween) to nearly the same height, so that the upper ⅔ of the envelope constitutes a double-walled shroud 90 about the girdle and the envelope wall portion 86, the arrangement then being substantially as shown in FIG. 5. During this stage and upon its completion the crew adjusts the film to locate the wall portion 92 within the wall portion 94, adjusts the resulting shroud 90 substantially uniformly about the girdle 50, and unties the cord ends 16 and 196. The ensuing procedure is as outlined for the first method from the corresponding stage. In such ensuing procedure the cord 196 will perform a mooring function (for which, in the first method, the cord 148 is provided).

The conventional balloon envelope is strung out along the ground with the bubble occupying a small fraction of the envelope at one end. As the bubble rises, it "peels" the uninflated portion off the ground. Such a launching requires a relatively low surface wind speed, and that the envelope be strung out parallel or nearly parallel with the surface wind direction, and with the bubble upwind. In a high wind, even one which does not change direction, the bubble will go downwind past the load while the load is still on the ground, and consequently drag the load along the ground and thereby damage the load. In a moderate or lower speed wind, a shift in wind direction will cause the load, when airborne, to pendulum down and hit the ground and be damaged thereby; such damage can be avoided only by having the crew, or a truck, carry the load off the ground to a position where it is substantially directly under the bubble when the bubble is high enough to insure against the load's striking or being dragged along the ground.

With the present invention these drawbacks are eliminated.

Although preferred embodiments have been described in some detail, they should be regarded as examples of the invention and not as restrictions or limitations thereof, as changes may be made in the construction and arrangement of the parts and in the methods without departing from the spirit and scope of the invention.

We claim:

1. In a balloon to be vertically launched, a telescopically folded balloon envelope having a closed crown, means including a diaphragm sealing fluid-tight the interior of the folded end of the innermost wall of the envelope and thereby dividing the envelope into tubular compartments, and means comprising a cord connected to the diaphragm and extending out of the envelope bottom to be pulled to render the sealing means inoperative.

2. In a balloon to be vertically launched, a telescopically folded balloon envelope having a closed crown, means including a diaphragm sealing fluid-tight the interior of the folded end of the innermost wall of the envelope and thereby dividing the envelope into tubular compartments, means comprising a cord connected to the diaphragm and extending out of the envelope bottom to be pulled to render the sealing means inoperative, means comprising a thimble disposed within the bottom portion of the innermost wall for introducing lift gas thereinto, and means comprising a corset releasably clamping the balloon envelope walls about the thimble.

3. In a balloon to be vertically launched, a telescopically folded balloon envelope having a closed crown, means sealing fluid-tight the interior of the folded end of the innermost wall of the envelope and thereby dividing the envelope into tubular compartments, means comprising a nipple disposed within the bottom portion of the innermost wall for introducing lift gas thereinto, means comprising a corset releasably clamping the balloon envelope walls about the nipple, the sealing means comprising a girdle about and adjacent the top of the innermost wall, an inflated annular tube cooperating with the girdle to clamp the innermost wall fluid-tight, and a fluid-tight diaphragm supported by and extending across the space defined by the tube, a cord connected with the diaphragm and extending out of the envelope bottom and operative after release of the corset to rupture the diaphragm to allow the gas to inflate the adjacent compartment, and means for deflating the tube.

4. In a balloon to be vertically launched, a telescopically folded balloon envelope, means including a fluid-tight diaphragm dividing the envelope into tubular compartments, and means for rupturing the diaphragm.

5. In a balloon structure, a partially inflated balloon envelope having an inflation bubble and being so constructed that, when fully inflated with lift gas, the envelope has a dome-shaped upper portion and a lower portion converging therefrom, a girdle frictionally embracing the envelope at the bottom of the inflation bubble and of substantially the same girth as the bottom of the envelope, an inflated annular tube within the envelope and clamping the envelope in gathered form to the girdle so as to prevent descent of the girdle along the envelope, means responsive to ascent of the envelope for deflating the tube to unclamp the envelope, the girdle, when so unclamped, being slidable down the envelope in response to expansion of the cone angle of the part of the envelope directly above the girdle.

6. In a balloon structure, a partially inflated balloon envelope having an inflation bubble and being so constructed that, when fully inflated, the envelope has a substantially dome-shaped upper portion and converges substantially conically from the upper portion, a girdle frictionally embracing the part of the envelope at the base of the bubble, means within the envelope and clamping the embraced part of the envelope to the girdle and thereby preventing the girdle from slipping down the envelope, and means responsive to ascent of the balloon to a predetermined altitude for rendering the clamping means inoperative.

7. In a balloon structure, a balloon envelope having an inflation bubble, a girdle frictionally embracing and constricting the envelope intermediate the height of the envelope and below the bubble to provide a dangling columnar lower envelope portion, the girdle being shiftable downward, in response to expansion of the envelope material directly over the girdle with increasing altitude, to reduce the length of the columnar portion, and means preventing such reduction until the balloon has reached a predetermined altitude.

8. In a method of preparing a balloon for vertical launching, the steps of vertically fully extending an uninflated inelastic film balloon envelope with the envelope crown uppermost and the envelope base lowermost, dividing the envelope into upper and lower tubular compartments in fluid-tight relation to each other and so that the upper compartment is about twice the vertical length of the lower compartment, and thereafter draping the material of the upper compartment about the lower compartment until the crown and the erstwhile bottom of the upper compartment are adjacent each other.

9. The method of claim 8, together with the step of corseting the resulting three plies of the envelope material at the bottom of the envelope.

10. In a method of packaging and vertically launching a balloon, the steps of telescopically folding an uninflated balloon film envelope into a three-ply tubular column whose length is substantially one-third of the length of the fully extended uninflated envelope with the entire normally upper third of the envelope constituting the outermost ply of the column, tethering the envelope crown and bottom with the column extending substantially horizontal, introducing lift gas into and confining it to the space surrounded by the innermost ply, untethering the crown and thus enabling the gas to swing the column to a substantially erect position, releasing the gas from confinement so as to enable the gas to raise the crown and thus unfold the envelope, and untethering the bottom of the envelope.

11. In a method of packaging and vertically launching a balloon, the steps of fluid-tight partitioning an uninflated balloon film envelope into upper and lower compartments, telescopically draping the upper compartment about the lower compartment to provide a three-ply tubular formation, holding the plies close together at the ends of the formation, tethering the bottom of the envelope, introducing lift gas into the lower compartment in sufficient quantity to erect the formation and provide free lift, opening the partition, and untethering the envelope for flight.

12. In a method of vertically launching a balloon whose envelope is telescopically folded into a three-ply tubular formation with the normally top third of the envelope outermost, the steps of extending the formation along the ground, tethering the crown and bottom of the envelope to the ground, introducing lift gas into and confining it to the innermost ply of the formation, untethering the crown and thus enabling the gas to erect the formation, freeing the gas from confinement and thus enabling the gas to form a bubble at the crown and initiate unfolding of the envelope, and untethering the bottom of the envelope.

13. In a balloon to be vertically launched:
an elongated uninflated balloon envelope having a crown and a base;
the envelope being telescopically folded, providing a three-walled tubular column with the crown and base at the respective ends of the column;
the base being disposed at an end of the innermost wall of the column;
means for inflating with lift gas the interior of the innermost wall;
sealing means preventing the gas from entering between the middle and outer walls of the column;
and means comprising a pull cord connected to the sealing means for rendering the sealing means inoperative.

14. The structure of claim 13, and releasable means holding together the three walls at the base end of the column.

15. In a balloon to be vertically launched:
a telescopically folded balloon envelope in the form of a three-walled tubular column having a crown and a base at the respective ends of the column;
means independent of the crown for sealing fluid-tight the interior of the folded end of the innermost wall of the folded envelope and thereby dividing the envelope into a single-walled inner tubular compartment and a double-walled tubular compartment about the inner compartment;
and means for rendering the sealing means inoperative.

16. The structure of claim 15, together with
means comprising a thimble disposed within the bottom portion of the innermost wall for introducing lift gas thereinto;
and means releasably clamping the three walls of the column about the thimble.

17. The method according to claim 8, and maintaining the lower compartment fully upright during the draping step.

18. In a method of preparing a balloon for vertical launching, the steps of:
gas-tight sealing an uninflated inelastic film balloon envelope intermediate the crown and base of the envelope into a first compartment confined between the crown and the seal and a second compartment confined between the base and the seal;
suspending from the crown and fully extending vertically the first compartment;
effecting mutual approach of the crown and seal until they are adjacent each other;
and arranging the material of the lower part of the first compartment about the sealed part of the envelope at initiation of the approach so that substantially the entire material of the first compartment at completion of the approach is doubled upon itself and surrounds the second compartment.

19. In a balloon system to be vertically launched:
an uninflated inelastic film balloon envelope having a crown and a base;
the envelope being telescopically folded in the form of a column having three generally concentric tubular walls each extending from the crown to the base;
the base being disposed at an end of the innermost wall of the column;
means sealing gas-tight the other end of the innermost wall, thereby dividing the column into a single-walled inner compartment bottomed by the base and a double-walled outer compartment topped by the crown;

means for inflating the inner compartment with lift gas;

the inner compartment being capable of containing sufficient lift gas to launch the balloon system and cause it to ascend to a predetermined ceiling altitude;

means for corseting the three walls at the base end of the column until completion of inflation;

means for rendering the sealing means inoperative, thereby enabling the gas to enter the outer compartment;

and means for uncorseting the walls at the base end of the column to enable the gas entering the outer compartment to initiate unfolding of and progressively unfold the envelope.

References Cited in the file of this patent

UNITED STATES PATENTS

| | | |
|---|---|---|
| 721,051 | King | Feb. 17, 1903 |
| 1,866,079 | Blondin | July 5, 1932 |
| 2,635,835 | Dungan et al. | Apr. 21, 1953 |
| 2,753,133 | Melton | July 3, 1956 |
| 2,783,002 | Ney et al. | Feb. 26, 1957 |
| 2,886,263 | Ferguson | May 12, 1959 |

FOREIGN PATENTS

| | | |
|---|---|---|
| 661,162 | Germany | June 13, 1938 |